United States Patent
Guo

(10) Patent No.: US 10,015,433 B2
(45) Date of Patent: Jul. 3, 2018

(54) SOUND ADJUSTMENT SYSTEM AND SOUND ADJUSTMENT METHOD

(71) Applicant: BOE TECHNOLOGY GROUP CO., LTD., Beijing (CN)

(72) Inventor: Weiqing Guo, Beijing (CN)

(73) Assignee: BOE TECHNOLOGY GROUP CO., LTD. (CN)

( * ) Notice: Subject to any disclaimer, the term of this patent is extended or adjusted under 35 U.S.C. 154(b) by 0 days.

(21) Appl. No.: 15/276,038

(22) Filed: Sep. 26, 2016

(65) Prior Publication Data

US 2017/0264852 A1  Sep. 14, 2017

(30) Foreign Application Priority Data

Mar. 8, 2016  (CN) .......................... 2016 1 0129969

(51) Int. Cl.
| | |
|---|---|
| *H04N 5/60* | (2006.01) |
| *G06K 9/00* | (2006.01) |
| *H04R 29/00* | (2006.01) |

(52) U.S. Cl.
CPC ........... *H04N 5/60* (2013.01); *G06K 9/00369* (2013.01); *H04R 29/001* (2013.01); *H04R 2430/01* (2013.01)

(58) Field of Classification Search
CPC .... H04N 5/60; G06K 9/00369; H04R 29/001; H04R 2430/01
See application file for complete search history.

(56) References Cited

U.S. PATENT DOCUMENTS

| | | | |
|---|---|---|---|
| 2002/0048376 A1* | 4/2002 | Ukita | ....................... H04N 7/15 381/92 |
| 2014/0313417 A1* | 10/2014 | Tateishi | ........... H04N 21/42203 348/683 |

(Continued)

FOREIGN PATENT DOCUMENTS

| | | |
|---|---|---|
| CN | 103581755 A | 2/2014 |
| CN | 103903606 A | 7/2014 |

(Continued)

OTHER PUBLICATIONS

First Office Action for Chinese Application No. 201610129969.8, dated Feb. 26, 2018, 7 Pages.

*Primary Examiner* — Michael Teitelbaum
(74) *Attorney, Agent, or Firm* — Brooks Kushman P.C.

(57) ABSTRACT

The present disclosure discloses a sound adjustment system and a sound adjustment method, relating to the field of sound processing technology, to address the problem that outside noise has an adverse impact on the user's viewing quality. The sound adjustment system comprises: a processor, a noise detection module, a position detection module, and a light detection module; the noise detection module is configured to detect noise that affects normal broadcast of a television, and send noise volume data acquired to the processor; the position detection module is configured to detect the distance between a noise source and the television, and send position data acquired to the processor; the light detection module is configured to detect whether there is a user in front of the television, and send light detection data acquired to the processor; the processor controls broadcasting volume and broadcasting progress of the television according to the noise volume data, the position data and the light detection data.

8 Claims, 3 Drawing Sheets

(56) References Cited

U.S. PATENT DOCUMENTS

| | | |
|---|---|---|
| 2016/0182944 A1 | 6/2016 | Han et al. |
| 2016/0274657 A1 | 9/2016 | Zhang |
| 2016/0372099 A1 | 12/2016 | Liu |

FOREIGN PATENT DOCUMENTS

| | | |
|---|---|---|
| CN | 103986891 A | 8/2014 |
| CN | 104618796 A | 5/2015 |
| CN | 104980810 A | 10/2015 |
| WO | 2014049057 A1 | 4/2014 |

\* cited by examiner

SOUND ADJUSTMENT SYSTEM AND SOUND ADJUSTMENT METHOD

CROSS-REFERENCE TO RELATED APPLICATIONS

This application claims priority to Chinese application No. 201610129969.8, filed Mar. 8, 2016, which is hereby incorporated by reference in its entirety.

TECHNICAL FIELD

The present disclosure relates to the field of sound processing technology, and in particular to a sound adjustment system and a sound adjustment method.

BACKGROUND

With the continuous improvement of people's quality of life, watching television has become a part of life, and while enjoying TV programs, people have more and more high quality requirements for viewing quality. In the actual process of watching TV programs, there are many factors incidentally affecting the viewing quality, such as: outside noise suddenly appearing; when this noise reaches a certain decibel, it may obscure the sound of TV programs broadcasted by a television, and because this suddenly appearing noise cannot be predicted in advance by the user, when outside noise suddenly appears to surpass the TV programs broadcasted by the television, the user need to manually adjust the broadcasting volume of the television or manually playback the broadcasted content missed, thereby reducing the user's viewing quality.

SUMMARY

The purpose of the present disclosure is to provide a sound adjustment system and a sound adjustment method for reducing adverse effects generated by external noise on the user's viewing quality.

To achieve the above purpose, the present disclosure provides the following technical solution:

a sound adjustment system, comprising: a processor, a noise detection module, a position detection module, and a light detection module; wherein, the noise detection module is configured to detect noise that affects normal broadcast by a television, and send noise volume data acquired to the processor;

the position detection module is configured to detect the distance between a noise source and the television, and send position data acquired to the processor;

the light detection module is configured to detect whether there is a user in front of the television, and send light detection data acquired to the processor; and the processor controls broadcasting volume and broadcasting progress of the television according to the noise volume data, the position data and the light detection data.

The present disclosure further provides a sound adjustment method, comprising:

a noise detection module of a sound adjustment system detecting noise that affects normal broadcast by a television, and sending noise volume data acquired to a processor;

a position detection module of the sound adjustment system detecting the distance between a noise source and the television, and sending position data acquired to the processor;

a light detection module of the sound adjustment system detecting whether there is a user in front of the television, and sending light detection data acquired to the processor; and the processor controlling broadcasting volume and broadcasting progress of the television according to the noise volume data, the position data and the light detection data.

The present disclosure further provides a sound adjustment method, comprising:

detecting the distance between a user and a television;

if the distance between the user and the television is larger than a standard distance, detecting noise emitted by a noise source to obtain noise volume data of the noise;

detecting the distance between the noise source and the television to obtain position data; and controlling broadcasting volume and broadcasting progress of the television according to the noise volume data and the position data.

In the sound adjustment system provided in the present disclosure, the noise detection module is capable of detecting noise that appears near the television and has affected the normal broadcast of the television, and sending the noise volume data acquired to the processor; the position detection module is capable of detecting the distance between the noise source and the television and sending the position data acquired for reflecting the distance relationship between the noise source and the television to the processor; the light detection module is capable of detecting whether there is a user in front of the television, and sending the light detection data acquired for reflecting whether there is a user in front of the television to the processor; the processor is capable of determining the volume and progress that should be broadcasted by the television according to the noise volume data, the position data and the light detection data received, and sending to the television a command to adjust the broadcasting volume and the broadcasting progress, while the television automatically adjusts the broadcasting volume and the broadcasting progress according to the received command so that people will not miss any wonderful program, thereby improving people's viewing quality very well.

DESCRIPTION OF THE DRAWINGS

The drawings herein described are configured to provide a further understanding of the present disclosure, and constitute part of the present disclosure. Illustrative embodiments of the disclosure and description thereof are for explaining the present disclosure, and do not constitute improper limitations on the present disclosure. In the drawings.

REFERENCE SIGNS

1—noise detection module, 2—position detection module, 3—light detection module, 4—prediction module, 5—processor.

DETAILED DESCRIPTION

As required, detailed embodiments are disclosed herein. However, it is to be understood that the disclosed embodiments are merely exemplary and that various and alternative forms may be employed. The figures are not necessarily to scale. Some features may be exaggerated or minimized to show details of particular components. Therefore, specific structural and functional details disclosed herein are not to be interpreted as limiting, but merely as a representative basis for teaching one skilled in the art.

To further illustrate the sound adjustment system and the sound adjustment method provided in embodiments of the present disclosure, the description will be discussed below in detail in conjunction with the accompanying drawings.

Figure 1:
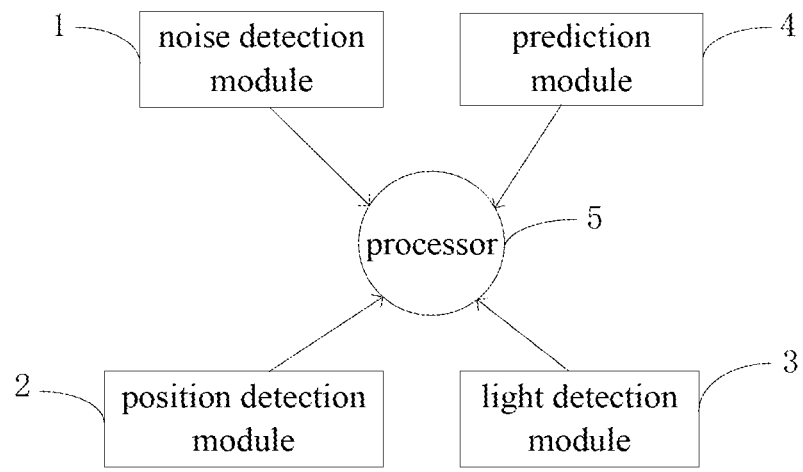
FIG. 1 is a schematic view of compositions of a sound adjustment system provided in some embodiments of the present disclosure.

Referring to FIG. 1, the sound adjustment system provided in embodiments of the present disclosure comprises: a processor 5, a noise detection module 1, a position detection module 2 and a light detection module 3; wherein, the noise detection module 1 is configured to detect noise that affects normal broadcast by a television, and send noise volume data acquired to the processor 5; specifically, there are many types of noise appearing in the vicinity of a television, such as: noise emitted by low-altitude flying aircraft, noise emitted by speeding train passing, noise emitted by driving motor vehicles and motorcycles without muffler installed, and noise emitted by firecrackers and the like; the noise detection module 1 is capable of detecting the noise volume and comparing it with a standard value set, then sending noise volume data corresponding to the noise that exceeds the standard value to the processor 5. It should be noted that the standard value is generally set according to the needs of users, and can be set to 70 decibels, but is not limited thereto. In addition, the noise detection module 1 generally includes a plurality of sound sensors capable of detecting the noise, and when a television is used indoor, the plurality of sound sensors may be even provided outside the window, so that the detection result is more accurate.

The position detection module 2 is configured to detect the distance between the noise source and the television, and send the position data acquired to the processor 5; in more detail, the position detection module reflects the distance of the noise source relative to the television, and the position detection module 2 sends the position data to the processor 5 in order that the processor 5 better determines the level of volume that should be broadcasted by the television, i.e., when the noise source is close to the television, the processor 5 may appropriately increase the level of broadcasting volume of the television, and when the noise source is far away from the television, the processor 5 may appropriately decrease the level of broadcasting volume of the television, so that the user can watch television programs more comfortably. Further, the position detection module 2 may be provided at many positions, preferably in the vicinity of the television.

The light detection module 3 is configured to detect whether there is a user in front of the television, and send light detection data acquired to the processor 5; further, the light detection module 3 is capable of determining whether the user is in the vicinity of the television, while a standard distance may be set for the determination; when the user is within the standard distance, it may be determined that the user is in the vicinity of the television, and in this case, the processor 5 controls the television to continue to broadcast in the original broadcasting volume; when the user is outside the standard distance, it may be determined that the user is not in the vicinity of the television, and in this case, the processor 5 controls the television to amplify the broadcasting volume to satisfy the user's viewing needs; it is worth noting that the standard distance may be set according to the user's actual needs, and is usually set to several tens of centimeters (for example: 20 cm). In addition, there are many types of the light detection module 3, and generally a light sensor is employed to implement its function, the amount of light should be at least a sensor, when a plurality of light sensors are used, the light sensors may be evenly distributed in the peripheral of the television, so that the light sensors can determine from multiple angles whether the user is in the vicinity of the television, making the determination result more accurate.

The processor 5 controls broadcasting volume and broadcasting progress of the television according to the noise volume data, the position data and the light detection data. Specifically, the processor 5 is capable of comprehensively determining the volume and progress that should be broadcasted by the television in combination with the volume of noise reflected by the noise volume data, the distance between the noise source and the television reflected by the position data, and whether the user is in front of the television reflected by the light detection data, and issuing to the television an instruction to adjust the volume and adjust the progress. When the processor 5 determines that the broadcasting volume of the television should be increased, the processor 5 can also determine how long such a large volume should last and after how long the television will return to its original broadcasting volume; when the processor 5 determines that the television should play back the content just broadcasted, the processor 5 can set the time for which the television should play back according to the user needs (for example: 10 seconds), thereby improving the user's viewing quality very well. It should be noted that, the television programs to be played back are stored on the television, and the required storage capacity is small, and that the television programs to be played back after power-down are no longer saved, saving the storage resources of the television. In addition, there are many types of the processor 5, for example: a host computer, but it is not limited thereto.

In the sound adjustment system provided in some embodiments of the present disclosure, the noise detection module 1 is capable of detecting noise that appears in the vicinity of the television and has affected the normal broadcast of the television, and sending noise volume data acquired to the processor 5; the position detection module 2 is capable of detecting the distance between the noise source and the television, and sending the position data for reflecting the distance relationship between the noise source and the television; the light detection module 3 is capable of detecting whether there is a user in front of the television, and sending the light detection data acquired for reflecting whether there is a user in front of the television to the processor 5; the processor is capable of determining the volume and progress that should be broadcasted by the television according to the noise volume data, the position data and the light detection data received, and sending to the television a command to adjust the broadcasting volume and the broadcasting progress, while the television automatically adjusts the broadcasting volume and the broadcasting progress according to the received command so that people will not miss any wonderful program, thereby improving people's viewing quality very well.

Figure 2:
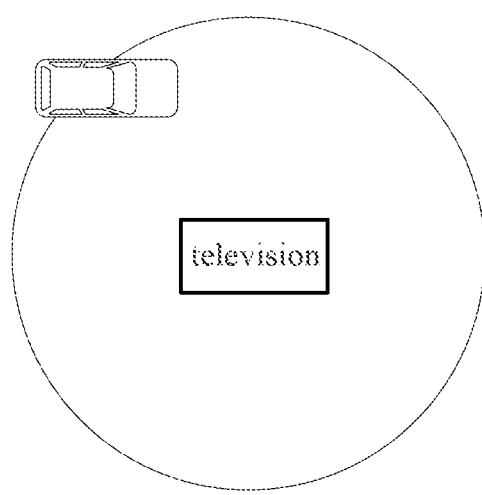
FIG. 2 is a schematic view of a noise source passing a television provided in some embodiments of the present disclosure.

In the actual judgment process of the processor 5, there will still be some factors that cause the processor 5 unable to make accurate determination, referring to FIG. 2 (the circle in the figure represents the distance near the television), for example: when a car without muffler installed is going to pass in the vicinity of the television, while the noise detection module 1 has not been able to detect the noise that exceeds the standard, and the position detection module 2 has not been able to determine the position data, the processor 5 will not increase the broadcasting volume of the television, but when the car suddenly passes in the vicinity of the television, the processor 5 might not be able to make timely determinations and issue an instruction to the television, thus affecting the user's viewing quality.

In order to avoid the effects on the user's viewing quality by the factors above, the sound adjustment system provided in the above-described embodiment further comprises a prediction module 4, the prediction module 4 for calling and analyzing traffic monitoring data and aviation data, comprehensively determining the change in the distance between the noise source and the television according to noise information acquired by sampling a plurality of times, and sending the position prediction information acquired to the processor 5, the processor 5 further controlling the broadcasting volume and broadcasting progress of the television according to the position prediction information. Specifically, the above traffic monitoring data is acquired by the prediction module 4 by calling data in the traffic monitoring system, and reflects the route in which the car without muffler installed or motorcycle is going to drive; the aviation data is acquired by the prediction module 4 by calling the records of aircraft taking off and trajectory in the airline system, and reflects the flight altitude and flying track of the aircraft, that is, it may be determined according to aviation data whether there is an aircraft flying over the vicinity of the television, which will bring roar that affects the user's viewing quality. The noise information indicates that the prediction module 4 samples noise multiple times in chronological order (the sampling of noise may be implemented by sharing through the information network of the noise detection module), and compares the samples acquired through sampling a plurality of times, to further obtain noise information reflecting the change in the distance between the noise source and the television (the noise source moving away from the television, or the noise source moving close to the television). It should be noted that sampling is performed preferably three times, whereby there is not too much sampling time wasted, while a reliable basis is provided for the comparative analysis of the sampling result by the subsequent prediction module 4.

Figure 3:
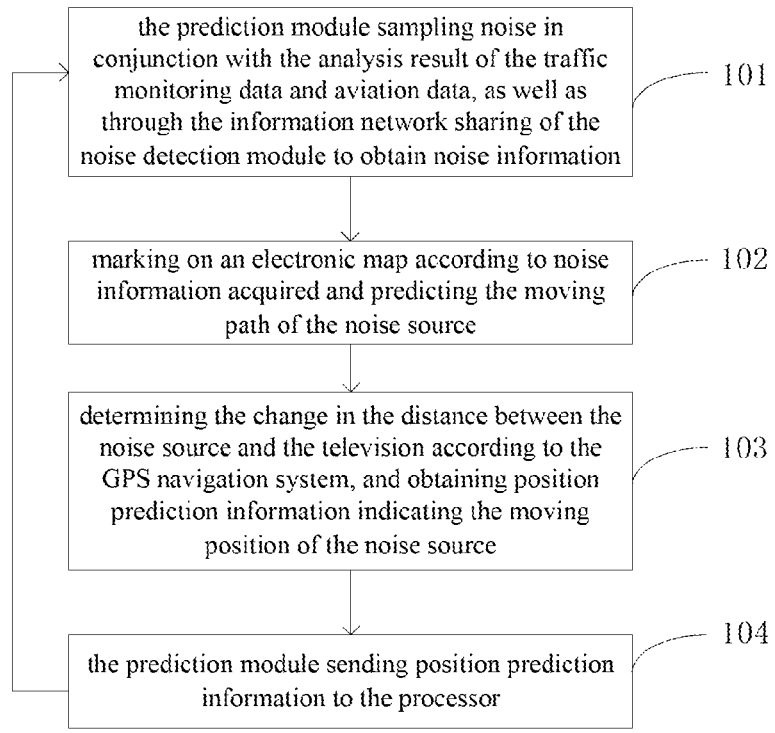
FIG. 3 is a schematic view of workflow of a prediction module provided in some embodiments of the present disclosure.

Referring to FIG. 3, the prediction module 4 in the actual work process specifically includes the following steps:

step 101, the prediction module 4 sampling noise in conjunction with the analysis result of the traffic monitoring data and aviation data, as well as through the information network sharing of the noise detection module 1 to obtain noise information;

step 102, marking on an electronic map according to noise information acquired and predicting the moving path of the noise source;

step 103, determining the change in the distance between the noise source and the television according to the GPS navigation system, and obtaining position prediction information that can reflect the moving position of the noise source; and step 104, the prediction module 4 sending position prediction information to the processor 5.

The processor 5 controls the broadcasting volume and broadcasting progress of the television in combination with the noise volume data, the position data, the light detection data and the position prediction information. This will avoid the problem that, when a car (the noise source) suddenly passes in the vicinity of the television, the processor 5 might not be able to make timely determination and issue an instruction to the television, ensuring the user's viewing quality. It is worth noting that there are many types of the prediction module 4, such as: server, but it is not limited thereto.

It is worth noting that the traffic monitoring data and aviation data are acquired by the processor 5 by calling big data, and when applying these data, the prediction module 4 needs to call from the processor 5. Further, the noise detection module 1, the position detection module 2, the prediction module 4 and the light detection module 3 may send corresponding data to the processor 5 in a variety of ways, and preferably, implement the sending of data via a wireless network.

In the sound adjustment system provided in some embodiments of the present disclosure, the noise detection module 1 has further the function of identifying the type of noise detected, and since different types of noise have different frequencies, the noise detection module 1 may determine the frequency of the noise after identifying the type of noise, then send to the processor 5 noise frequency data reflecting the frequency of the noise itself. Thus, when determining the volume and progress that should be broadcasted by the television, the processor 5 considers not only the noise volume data, but also considers the noise frequency data, that is, when the detected noise volume exceeds the standard value, also considers the frequency of the noise. If the frequency of the noise is low and not enough to have an impact on the broadcasting volume of the television, in this case, the processor 5 does not issue to the television an instruction to adjust the volume and progress, that is, the television still remains the original volume and progress. In addition, the processor 5 is also able to determine the level of sound that should be broadcasted by the television according to the received noise frequency data, and when the frequency of noise emitted by the noise source is high, the processor 5 will control the television to broadcast the volume of a higher level, so that the user can watch the television programs more comfortably.

In real life, the television is used indoor or outdoor according to the user's need, when the television is used indoor, the position detection module 2 is also configured to detect the position of the user relative to the noise source and the television, and send the acquired user position data to the processor 5, and the processor 5 also controls the broadcasting volume and progress of the television according to the user position data. In more detail, since the noise is generally transmitted interior from a window to interfere the broadcast of the television, the position detection module 2 may determine the relative position among the three by detecting the distance among the television, the user and the window, so as to obtain the user position data; when the user is in the vicinity of the window, the processor 5 can control the television to broadcast the volume of a higher level, when the user is far away from the window, the processor 5 may control the television to broadcasting volume of a lower sound level; moreover, the processor 5 also will control the broadcasting progress of the television according to the user position data.

The processor 5 provided in the above-described embodiment is also capable of calling the program broadcasting data from the broadcast program system, and control the broadcasting volume and progress of the television according to the program broadcasting data. In more detail, the broadcast program data reflects whether the content broadcasted currently by the television is advertisements or other more valuable programs, and if the current content broadcasted by the television is advertisements, the processor 5 will not adjust the broadcasting volume and progress of the television.

Figure 4:
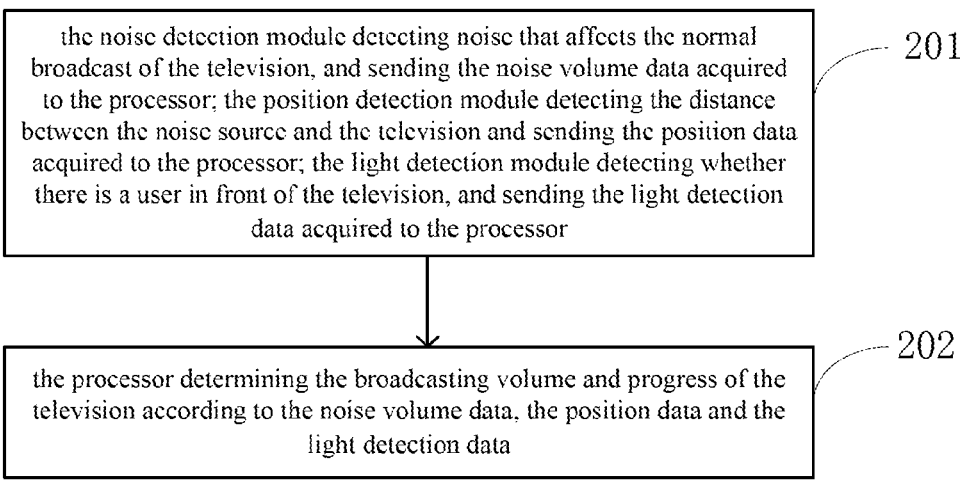
FIG. 4 is a flowchart of a sound adjustment method provided in some embodiments of the present disclosure.

Some embodiments of the present disclosure also provide a sound adjustment method, namely, the sound adjustment system provided in the above-described embodiments is configured to automatically adjust the sound. Referring to FIG. 4, the sound adjustment method comprises:

step 201, the noise detection module 1 detecting noise that affects the normal broadcast of the television, and sending the noise volume data acquired to the processor 5; the position detection module 2 detecting the distance between the noise source and the television and sending the position data acquired to the processor 5; the light detection module 3 detecting whether there is a user in front of the television, and sending the light detection data acquired to the processor 5; and step 202, the processor 5 determining the broadcasting volume and progress of the television according to the noise volume data, the position data and the light detection data.

The sound adjustment system abovementioned further includes a prediction module 4, the prediction module 4 calling and analyzing the traffic monitoring data and the aviation data, determining the change in the distance between the noise source and the television according to noise information acquired by sampling a plurality of times, and sending the position prediction information acquired to the processor 5, the processor 5 further controlling the broadcasting volume and broadcasting progress of the television according to the position prediction information.

The noise detection module 1 further identifies the type of noise detected, and sends the noise frequency data corresponding to the detected noise to the processor 5, while the processor 5 further controls the broadcasting volume and progress of the television according to the noise frequency data. In addition, when the television is used indoor, the position detection module 2 also detects the position of the user relative to the noise source and television, and sends the acquired user position data to the processor 5; the processor 5 also controls the broadcasting volume and progress of the television according to the user position data.

The processor 5 provided in the above-described embodiments is also capable of calling the program broadcasting data from the broadcast program system, and controlling the broadcasting volume and progress of the television according to the program broadcasting data.

The various embodiments in the present description are described in a progressive way, and the same and similar parts between the various embodiments may refer to each other, while each embodiment highlights the difference from other embodiments. In particular, for the method embodiment, since it is substantially similar to the product embodiment, it is described simply, and the relevant part may refer to the part in the produce embodiment.

Figure 5:
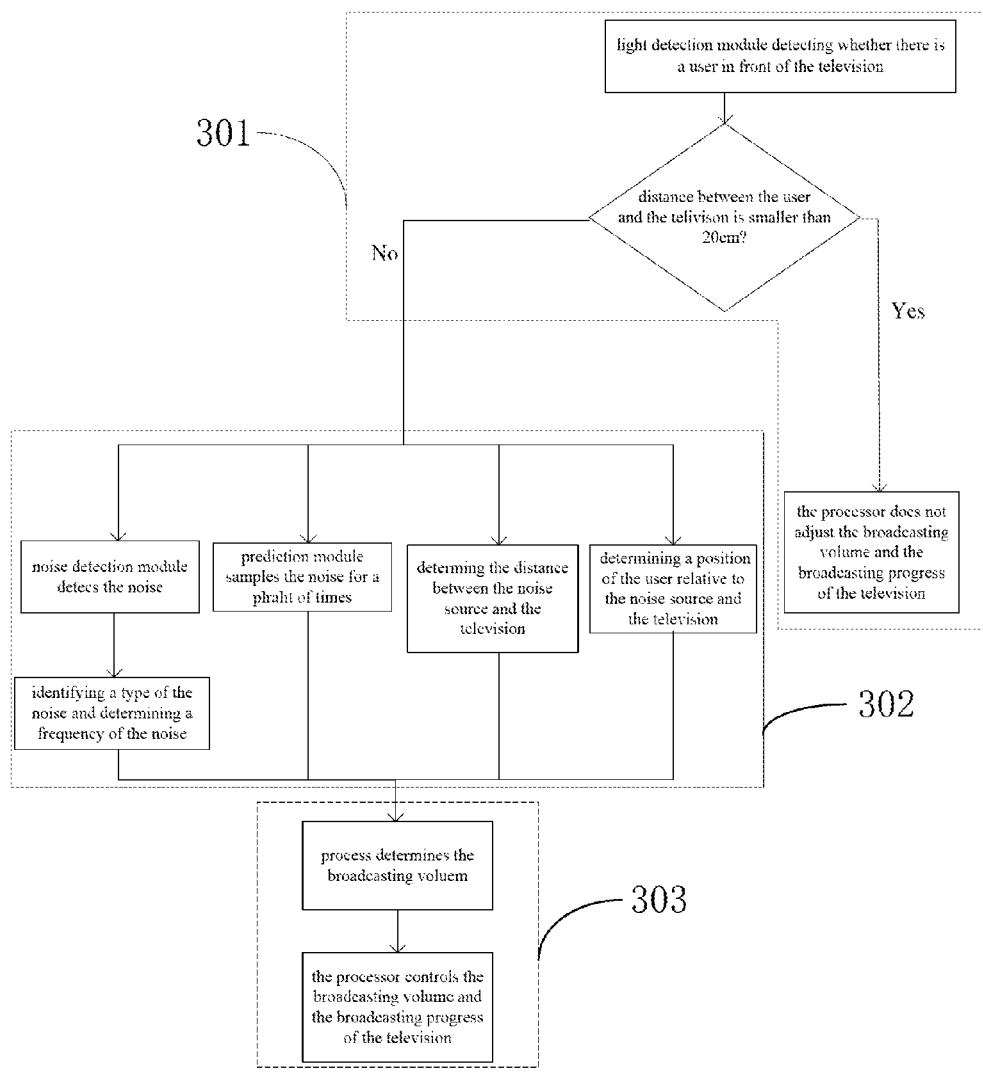
FIG. 5 is a schematic view of a sound adjustment method when the television is used indoor provided in some embodiments of the present disclosure

Referring to FIG. 5, in order to more clearly illustrate the process of the sound adjustment system automatically adjusting the sound, the specific embodiment when the television is used indoor is given below.

The process of the sound adjustment system automatically adjusting the sound specifically includes the following steps.

In step 301, the light detection module 3 detects whether there is a user in the vicinity of the television, and determines the distance between the user and the television; when the distance between the user and the television is less than or equal to 20 cm, the processor 5 does not adjust the broadcasting volume and progress of the television.

In step 302, when the distance between the user and the television is larger than 20 cm, the noise detection module 1 detects the noise emitted from the noise source, in order to obtain the noise volume data, while the noise detection module 1 identifies the type of noise with volume exceeding 70 decibels, and obtains the noise frequency data, and the noise detection module 1 sends the noise volume data and the noise frequency data to the processor 5;

the prediction module 4 samples noise multiple times through an information network sharing of the noise detection module 1, predicts the direction in which the noise source is going to move in combination with the analysis of the traffic monitoring data and aviation data, and sends the acquired position prediction information to the processor 5; and the position detection module 2 detects the distance among the noise source, the television and the user, and sends the position data and user position data acquired to the processor 5.

In step 303, the processor 5 determines the level of sound that should be broadcasted by the television and the broadcasting progress of the television in combination with the noise volume data, the noise frequency data, the position prediction information, the light detection data, the position prediction data and the user position data.

In the above described embodiments, the particular features, structures, materials, or features may be combination in a suitable manner in any one or more embodiments.

The foregoing is merely specific embodiments of the present disclosure, but the scope of the present disclosure is not limited thereto, and any person skilled in the art may easily conceive of variations or alternations within the technical scope of the present disclosure disclosed, which should fall within the scope of the present disclosure. Accordingly, the scope of the present disclosure should be based on the scope of the claims.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A sound adjustment system, comprising: a processor, a noise detection module, a position detection module and a light detection module, wherein the noise detection module is configured to detect noise that affects normal broadcasting of a television, and send acquired noise volume data to the processor;

the position detection module is configured to detect a distance between a noise source and the television, and send acquired position data to the processor;

the light detection module is configured to detect whether there is a user in front of the television, and send acquired light detection data to the processor; and the processor controls a broadcasting volume and a broadcasting progress of the television based on the noise volume data, the position data and the light detection data;

wherein the system further comprises a prediction module configured to call and analyze traffic monitoring data and aviation data, determine a change of the distance between the noise source and the television based on noise information acquired by a plurality of times of sampling, and send acquired position prediction information to the processor, and the processor controls the broadcasting volume and the broadcasting progress of the television based on the position prediction information.

2. The sound adjustment system according to claim 1, wherein the noise detection module is further configured to identify a type of the noise and send corresponding noise frequency data to the processor, and the processor controls the broadcasting volume and the broadcasting progress of the television based on the noise frequency data.

3. The sound adjustment system according to claim 2, wherein when the television is used indoor, the position detection module is further configured to detect a position of the user relative to the noise source and the television, and send acquired user position data to the processor, and the processor controls the broadcasting volume and the broadcasting progress of the television based on the user position data.

4. The sound adjustment system according to claim 1, wherein the processor controls the broadcasting volume and the broadcasting progress of the television based on program broadcasting data called from a broadcast program system.

5. A sound adjustment method, comprising:

detecting noise that affects normal broadcasting of a television, and sending acquired noise volume data to a processor of a sound adjustment system, by a noise detection module of the sound adjustment system;

detecting a distance between a noise source and the television, and sending acquired position data to the processor, by a position detection module of the sound adjustment system;

detecting whether there is a user in front of the television, and sending acquired light detection data to the processor, by a light detection module of the sound adjustment system; and controlling, by the processor, a broadcasting volume and a broadcasting progress of the television based on the noise volume data, the position data and the light detection data;

wherein the method further comprises:

calling and analyzing traffic monitoring data and aviation data by a prediction module of the sound adjustment system;

determining a change of the distance between the noise source and the television based on noise information acquired by a plurality of times of sampling, and sending acquired position prediction information to the processor; and controlling, by the processor, the broadcasting volume and the broadcasting progress of the television based on the position prediction information.

6. The sound adjustment method according to claim 5, wherein the noise detection module is further configured to identify a type of the noise and send corresponding noise frequency data to the processor, and the processor controls the broadcasting volume and the broadcasting progress of the television based on the noise frequency data.

7. The sound adjustment method according to claim 6, wherein when the television is used indoor, the position detection module is further configured to detect a position of the user relative to the noise source and the television, and send acquired user position data to the processor, and the processor controls the broadcasting volume and the broadcasting progress of the television based on the user position data.

8. The sound adjustment method according to claim 5, wherein the processor controls the broadcasting volume and the broadcasting progress of the television based on program broadcasting data called from a broadcast program system.

* * * * *